(12) United States Patent
Inagaki et al.

(10) Patent No.: US 11,392,054 B2
(45) Date of Patent: Jul. 19, 2022

(54) OPTICAL SCANNING APPARATUS HAVING PLURAL PHASE CONTROL UNITS FOR A RESPECTIVE PLURALITY OF ROTATING POLYGONAL MIRRORS AND IMAGE FORMING APPARATUS THEREWITH

(71) Applicant: CANON KABUSHIKI KAISHA, Tokyo (JP)

(72) Inventors: Masaki Inagaki, Mishima (JP); Hideaki Hirasawa, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/023,301

(22) Filed: Sep. 16, 2020

(65) Prior Publication Data

US 2021/0088929 A1   Mar. 25, 2021

(30) Foreign Application Priority Data

Sep. 24, 2019   (JP) .............................. JP2019-173404

(51) Int. Cl.
| | |
|---|---|
| *G03G 15/00* | (2006.01) |
| *G03G 15/04* | (2006.01) |
| *G02B 26/12* | (2006.01) |
| *G03G 15/043* | (2006.01) |

(52) U.S. Cl.
CPC ..... *G03G 15/04072* (2013.01); *G02B 26/123* (2013.01); *G02B 26/127* (2013.01); *G03G 15/043* (2013.01); *G03G 2215/0404* (2013.01)

(58) Field of Classification Search
USPC .................................................. 399/200, 201
See application file for complete search history.

(56) References Cited

U.S. PATENT DOCUMENTS

| | | | |
|---|---|---|---|
| 6,493,019 B1 | 12/2002 | Hirasawa ...................... 347/233 |
| 6,501,493 B2 | 12/2002 | Fujimoto et al. ............. 347/116 |
| 2009/0141328 A1* | 6/2009 | Nakahata ............ G02B 26/123 359/201.2 |
| 2018/0017784 A1* | 1/2018 | Kamei ................. G02B 26/127 |

FOREIGN PATENT DOCUMENTS

JP         2003-127456        5/2003

* cited by examiner

*Primary Examiner* — Quana Grainger
(74) *Attorney, Agent, or Firm* — Venable LLP (57) ABSTRACT

An optical scanning apparatus includes a first rotating polygonal mirror that deflects a light beam such that the light beam scans a surface of a first image carrier, and a second rotating polygonal mirror that deflects a light beam such that the light beam scans a surface of a second image carrier. The optical scanning apparatus further includes a first phase control unit that performs phase control of the first rotating polygonal mirror based on a first detection signal output from a first detection unit and a first target phase, and a second phase control unit that performs phase control of the second rotating polygonal mirror based on a second detection signal output from a second detection unit and a second target phase, which is set with respect to the first target phase.

10 Claims, 9 Drawing Sheets

OPTICAL SCANNING APPARATUS HAVING PLURAL PHASE CONTROL UNITS FOR A RESPECTIVE PLURALITY OF ROTATING POLYGONAL MIRRORS AND IMAGE FORMING APPARATUS THEREWITH

BACKGROUND OF THE INVENTION

Field of the Invention

The present invention relates to an optical scanning apparatus for use in an electrophotographic image forming apparatus and the like, and an image forming apparatus.

Description of the Related Art

Some optical scanning apparatuses used in image forming apparatuses include, for controlling rotation of a polygon mirror (rotating polygonal mirror), both a rotation control circuit for performing rotation control for rotating a polygon mirror at a constant speed and a phase control circuit for controlling a rotation phase of the polygon mirror. For example, in the case where an optical scanning apparatus includes a plurality of polygon mirrors respectively corresponding to a plurality of image carriers, both of such a rotation control circuit and a phase control circuit are provided for each of the polygon mirrors. In this case, it is generally so configured that each phase control circuit independently performs the phase control of the polygon mirror thereof using as a reference a phase reference signal which is common to all of the polygon mirrors (for example, see Japanese Patent Laid-Open No. 2003-127456).

However, if the rotation control of the plurality of polygon mirrors is performed by such phase controls that independently control the polygon mirrors, it would possibly take a long time before the rotation phases of the polygon mirrors come to a target phase. As a result of this, the image forming apparatus would possibly take a long time before outputting a first page, that is, would possibly take a long First Page Out Time (FPOT).

SUMMARY OF THE INVENTION

The present invention has been made in view of the aforementioned problems and provides a technique for shortening the time necessary for the phase control of a plurality of polygon mirror in an optical scanning apparatus.

According to one aspect of the present invention, there is provided an optical scanning apparatus, comprising: a first rotating polygonal mirror to which a light beam is irradiated, and that deflects the light beam such that the light beam scans a surface of a first image carrier; a second rotating polygonal mirror to which a light beam is irradiated, and that deflects the light beam such that the light beam scans a surface of a second image carrier; a first detection unit provided on a scanning path of the light beam deflected by the first rotating polygonal mirror, and that outputs a first detection signal when the light beam is made incident on the first detection unit; a second detection unit provided on a scanning path of the light beam deflected by the second rotating polygonal mirror, and that outputs a second detection signal when the light beam is made incident on the second detection unit; a first phase control unit that performs phase control of the first rotating polygonal mirror based on the first detection signal output from the first detection unit and a first target phase; and a second phase control unit that performs phase control of the second rotating polygonal mirror based on the second detection signal output from the second detection unit and a second target phase, which is set with respect to the first target phase.

According to another aspect of the present invention, there is provided an image forming apparatus, comprising: a first image carrier for use in formation of an image of a first color; a second image carrier for use in formation of an image of a second color; and an optical scanning apparatus comprising: a first rotating polygonal mirror to which a light beam is irradiated, and that deflects the light beam such that the light beam scans a surface of the first image carrier; a second rotating polygonal mirror to which a light beam is irradiated, and that deflects the light beam such that the light beam scans a surface of the second image carrier; a first detection unit provided on a scanning path of the light beam deflected by the first rotating polygonal mirror, and that outputs a first detection signal when the light beam is made incident on the first detection unit; a second detection unit provided on a scanning path of the light beam deflected by the second rotating polygonal mirror, and that outputs a second detection signal when the light beam is made incident on the second detection unit; a first phase control unit that performs phase control of the first rotating polygonal mirror based on the first detection signal output from the first detection unit and a first target phase; and a second phase control unit that performs phase control of the second rotating polygonal mirror based on the second detection signal output from the second detection unit and a second target phase, which is set with respect to the first target phase, and wherein the optical scanning apparatus forms an electrostatic latent image on the first image carrier by exposing the first image carrier with the light beam deflected by the first rotating polygonal mirror, and forms an electrostatic latent image on the second image carrier by exposing the second image carrier with the light beam deflected by the second rotating polygonal mirror.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

In a first embodiment, an example in which phase control of a polygon mirror of a scanner unit for firstly forming an electrostatic latent image on a photosensitive drum is used as a reference for phase controls of the polygon mirrors of the other scanner units will be described. In the following, the first embodiment will be described with reference to FIGS. 1 to 6B.

<Image Forming Apparatus>

Figure 2:
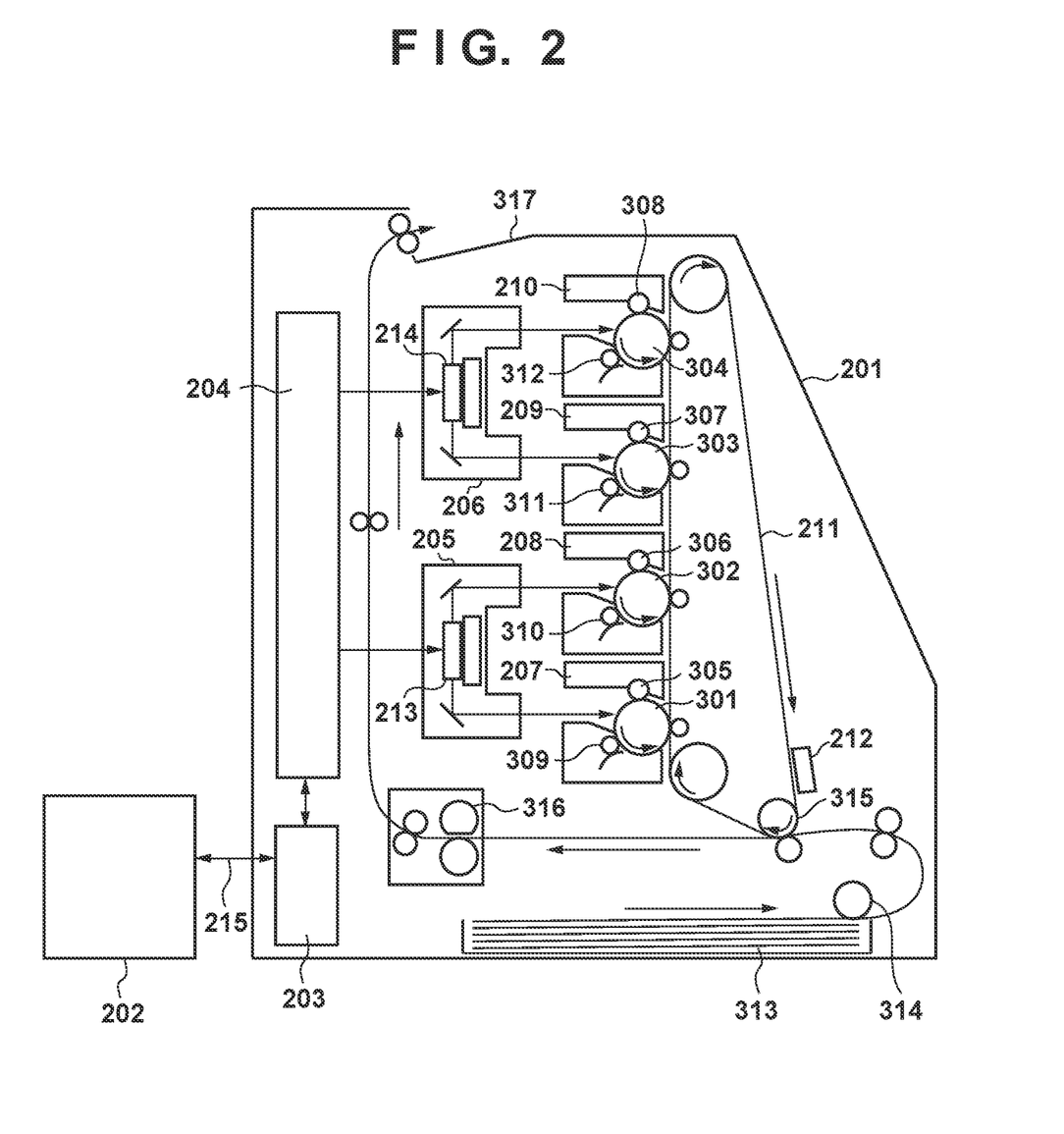
FIG. 2 is a cross-sectional view illustrating a configuration example of a laser printer.

FIG. 2 is a cross-sectional view illustrating an example of a hardware configuration of a laser printer 201, which is an image forming apparatus according to the present embodiment. The laser printer 201 is communicably connected with an external apparatus 202 such as a personal computer (PC) via a general-purpose interface 215. The laser printer 201 includes a video controller 203, an engine controller 204, and scanner units 205 and 206.

The laser printer 201 is a color laser printer which is a four-drum type and is configured to form toner images of four colors using four colors of toner, namely Yellow (Y), Magenta (M), Cyan (C), and Black (BK), and to form a color image by overlapping these toner images. The laser printer 201 includes four image forming units that respectively form toner images of Y, M, C and BK for forming the toner images of four colors. The four image forming units respectively include toner cartridges 207 to 210 storing Y, M, C and BK toner (developing material), photosensitive drums 301 to 304 respectively for the toner colors, charging rollers 305 to 308 respectively for the toner colors, and developing units 309 to 312 respectively for the toner colors. The photosensitive drums 301 to 304 are one example of photosensitive members functioning as image carriers.

The scanner unit 205 is used for forming a Y image and an M image, whereas the scanner unit 206 is used for forming a C image and a BK image. Thus, the scanner unit 205 constitutes part of the image forming units for forming the Y image and the M image, and the scanner unit 206 constitute part of the image forming units for forming the C image and the BK image.

The scanner unit 205 includes laser light sources (laser diodes (LDs) 401 and 402 in FIG. 3) that generate light beams by laser (laser beams) as light beams for performing exposure of the photosensitive drums 301 and 302, and a polygon mirror (hereinafter, which may be referred to as a "PM") 213. The scanner unit 205 is configured to irradiate the laser beams onto the photosensitive drums 301 and 302. In the present embodiment, the PM 213 is one example of a first rotating polygonal mirror on which a light beam is irradiated, and configured to deflect the light beam such that the light beam scans a surface of the photosensitive drum 301 (first image carrier).

The scanner unit 206 includes laser light sources that generate laser beams as light beams for performing exposure of the photosensitive drums 303 and 304, and a PM 214. The scanner unit 206 is configured to radiate the laser beams onto the photosensitive drums 303 and 304. In the present embodiment, the PM 214 is one example of a second rotating polygonal mirror on which a light beam is irradiated, and configured to deflect the light beam such that the light beam scans a surface of the photosensitive drum 302 (second image carrier).

If the external apparatus 202 gives a print start instruction to the laser printer 201 via the general-purpose interface 215, the engine controller 204 controls the image forming units to perform image formation according to the print start instruction. The following operations are performed by the image forming units. The charging rollers 305 to 308 are configured to uniformly charge the surfaces of the photosensitive drums 301 to 304, respectively. After that, the scanner units 205 and 206 expose the surface of the photosensitive drums 301 to 304 with the laser beams based on image signals output from the video controller 203, thereby forming electrostatic latent images on the photosensitive drums 301 to 304, respectively.

Next, the developing units 309 to 312 develop (visualize) the electrostatic latent images thus formed on the corresponding photosensitive drums 301 to 304 with the toner stored in the corresponding toner cartridges 207 to 310. In this way, toner images of the respective colors are formed on the photosensitive drums 301 to 304. The toner images thus formed on the photosensitive drums 301 to 304 are transferred onto an intermediate transfer belt 211 such that the toner images are overlapped on one another in order. In this way, a color image is formed on the intermediate transfer belt 211.

The color image thus formed on the intermediate transfer belt 211 is transferred onto a recording sheet by a transfer roller 315. Specifically, the recording sheet in a cassette 313 is fed into a conveyance path by a paper feeding roller 314. After that, onto the recording sheet thus conveyed via the conveyance path, the color image is transferred from the intermediate transfer belt 211 by the transfer roller 315. The recording sheet with the color image transferred thereon is conveyed to a fixing unit 316. The fixing unit 316 fixes the color image onto the recording sheet. After that, the recording sheet is discharged onto a paper discharge tray 317.

The laser printer 201 includes a registration detecting sensor 212 for use in reading a color misregistration detection pattern being formed on the intermediate transfer belt 211. The registration detecting sensor 212 includes a light receiving sensor configured to receive reflection light reflected from the color misregistration detection pattern as a result of light being irradiated from the light source to the color misregistration detection pattern. The temporal changes in an intensity of an output signal of the registration detecting sensor 212 (light receiving sensor) when the color misregistration detection pattern formed on the intermediate transfer belt 211 passes through a detection region of the registration detecting sensor 212 are obtained as color misregistration information. The color misregistration information is used for color misregistration correction described later.

<Configuration of the Scanner Unit>

Figure 3:
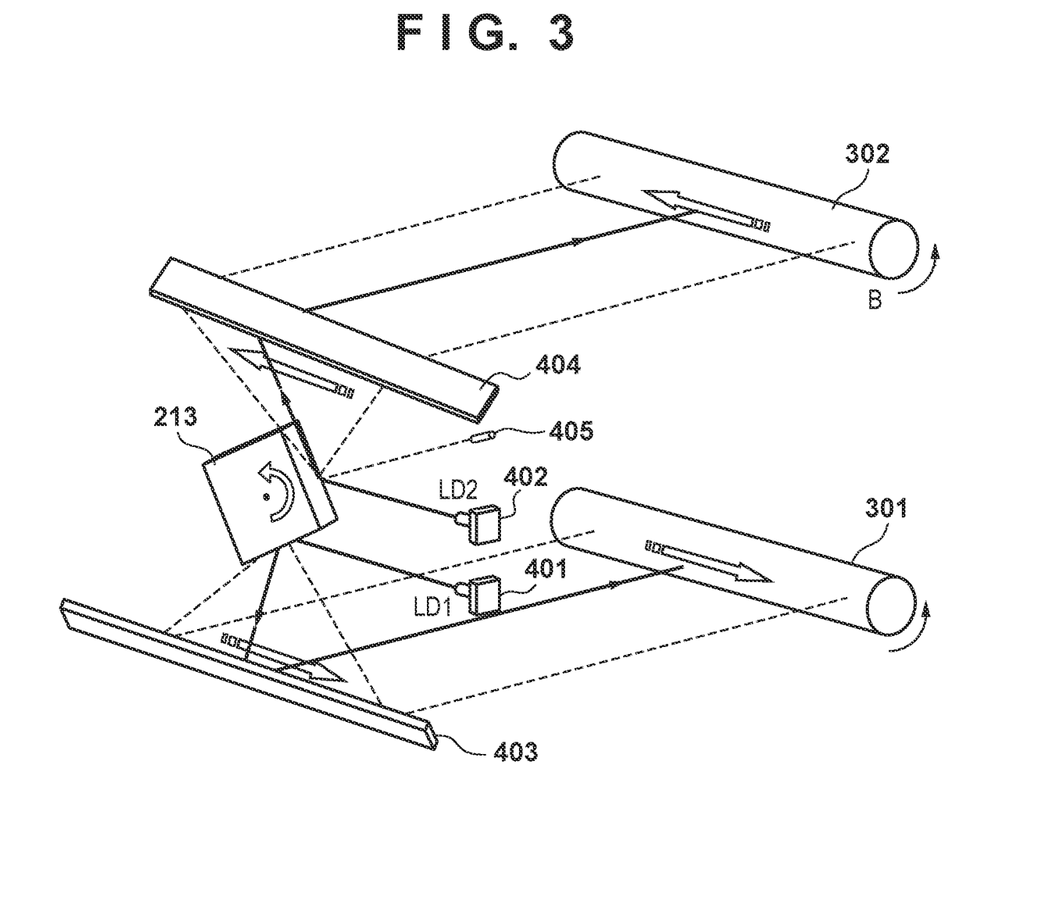
FIG. 3 is a perspective view illustrating a configuration example of a scanner unit.

FIG. 3 is a perspective view illustrating one configuration example of the scanner units 205 and 206 according to the present embodiment. The scanner units 205 and 206 have an identical configuration. In the following, the scanner unit 205 will be described, but the same description is applicable to the scanner unit 206 as well.

The scanner unit 205 includes the LD (laser diodes) 401 and 402, which are semiconductor lasers. The LDs 401 and 402 are used as the light sources for the exposure of the photosensitive drums 301 and 302, respectively.

The laser beam output from the LD 401 is reflected on a reflection surface of the PM 213, and further reflected on a reflection mirror 403, thereby being irradiated to the surface of the photosensitive drum 301. The laser beam output from the LD 402 is irradiated to one reflection surface among reflection surfaces of the PM 213, the reflection surface being a reflection surface to which the laser beam output from the LD 401 is not irradiated. The laser beam reflected on this reflection surface is further reflected on a reflection mirror 404, thereby being irradiated to the surface of the photosensitive drum 302. In the present embodiment, the LDs 401 and 402 each include a plurality of light emitting points (light emitting elements) each configured to output a laser beam (light beam), and is a laser light source capable of outputting a plurality of laser beams at once.

A BD (beam detection) sensor 405 is a light sensor used as a main scanning synchronization sensor. The BD sensor 405 is provided on a scanning path of the laser beam output from the LD 402, and is configured to output, when the laser beam is made incident on this sensor, a BD signal as a detection signal indicating detection of the laser beam. The BD signal is used in PM control units 501 and 511 (see FIG. 5, which will be described later) for rotation controls of the PMs 213 and 214 (more specifically, rotation controls of polygon motors (scanner motors) configured to respectively drive the PMs 213 and 214). Moreover, the BD signal is also used in the video controller 203 for controlling a timing to start writing in the main scanning direction.

<Color Shift Correction>

Figure 4A:
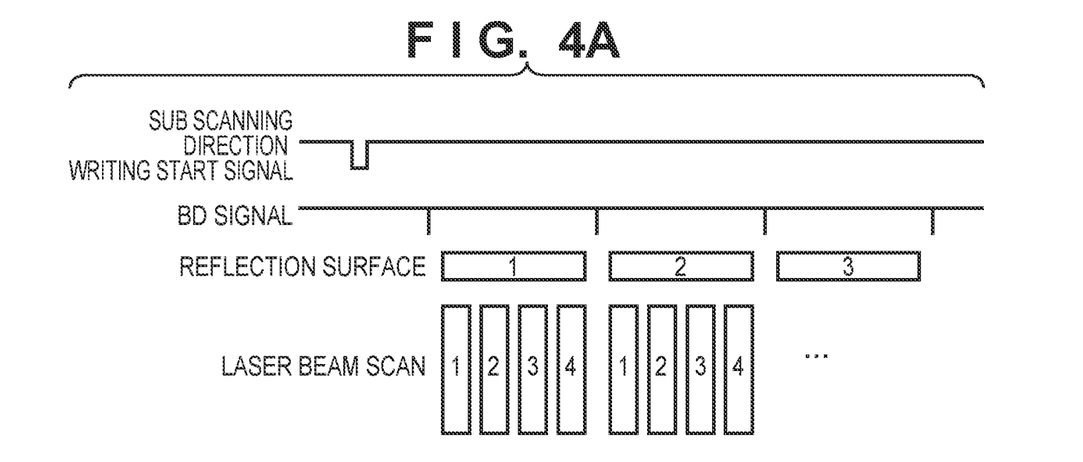
FIGS. 4A to 4C illustrate examples of color misregistration correction.
Figure 4B:
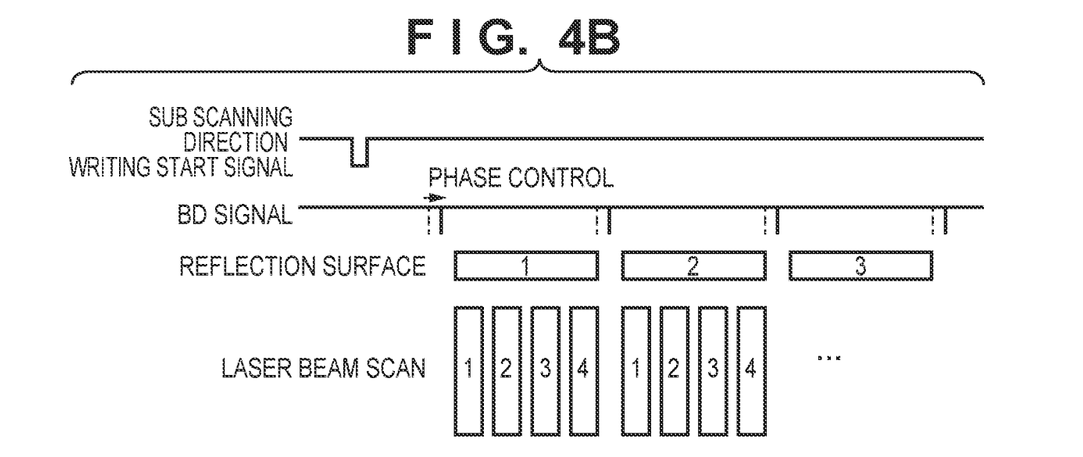
Figure 4C:
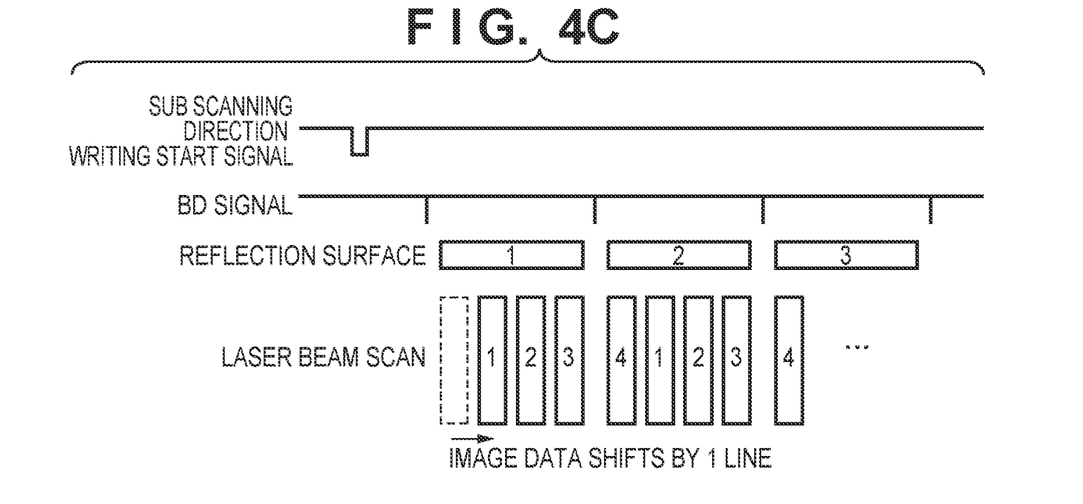

FIGS. 4A to 4C illustrate examples of color misregistration correction performed in the laser printer 201 according to the present embodiment. This example describes a case where the LD 401 (402) outputs four laser beams, with which the scanning of the photosensitive drum 301 (302) is performed by using the reflection surfaces of the PM 213 (214). The scanning with the four laser beams is parallelly performed in four different lines (four main scanning lines aligned in parallel in the sub scanning direction and corresponding to four pixels aligned in the sub scanning direction) on the photosensitive drum 301 (302). Note that the following describes the image forming unit for the Y image because all of the image forming units for Y, M, C, and BK images have an identical configuration, and therefore the same description is applicable to the image forming units M, C, and BK images.

FIG. 4A illustrates a state where the exposure of the photosensitive drum 301 is performed according to (in synchronization with) the BD signal obtained from the scanner unit 205 (BD sensor 405). Using as a reference a writing start signal in the sub scanning direction which is supplied from the engine controller 204, the video controller 203 determines a timing to start writing in the sub scanning direction, and generates image signals. Specifically, in a period between receiving the writing start signal in the sub scanning direction and receiving one BD signal, the video controller 203 generates image signals for the four lines to be aligned in the sub scanning direction. After that, using as a reference a reception timing of the BD signal, the laser beams corresponding to the respective lines are irradiated to the photosensitive drum 301 based on the image signals for the four lines, thereby an electrostatic latent image being formed on the photosensitive drum 301. As such, the timing of starting the writing in the main scanning direction for each line is controlled using the reception timing of the BD signal as a reference.

FIG. 4B illustrates a state where the timing of the start of writing in the sub scanning direction is corrected by changing a rotation phase of the PM 213 by a phase control unit 503 (FIG. 5) described later. The rotation phase of the PM 213 is controlled by the phase control unit 503 based on the BD signal as described later. FIG. 4B illustrates a case where the rotation phase of the PM 213 is changed such that the BD signal received from the scanner unit 205 (BD sensor 405) will be changed from the BD signal indicated with a broken line to the BD signal indicated with a solid line. As such, by delaying the timing of receiving the BD signal by controlling the rotation phase of the PM 213 (phase control), it is possible to delay the timing of starting the writing in the sub scanning direction. On the contrary, by advancing the timing of receiving the BD signal, it is possible to advance the timing of starting the writing in the sub scanning direction. With such control, where to start the writing in the sub scanning direction can be corrected by the unit of less than one pixel in the sub scanning direction.

FIG. 4C illustrates a state where the timing of starting the writing in the sub scanning direction is delayed by one pixel (by 1 line) for the color misregistration correction. In this example, the video controller 203 corrects the image data such that the image data is shifted by one line to delay the timing of starting the writing in the sub scanning direction. In this way, where to start the writing in the sub scanning direction can be corrected by the unit of one pixel, by adjusting a timing of the light emission of the LD 401 (402) based on the image data.

<Control Configuration of the Scanner Units>

Figure 5:
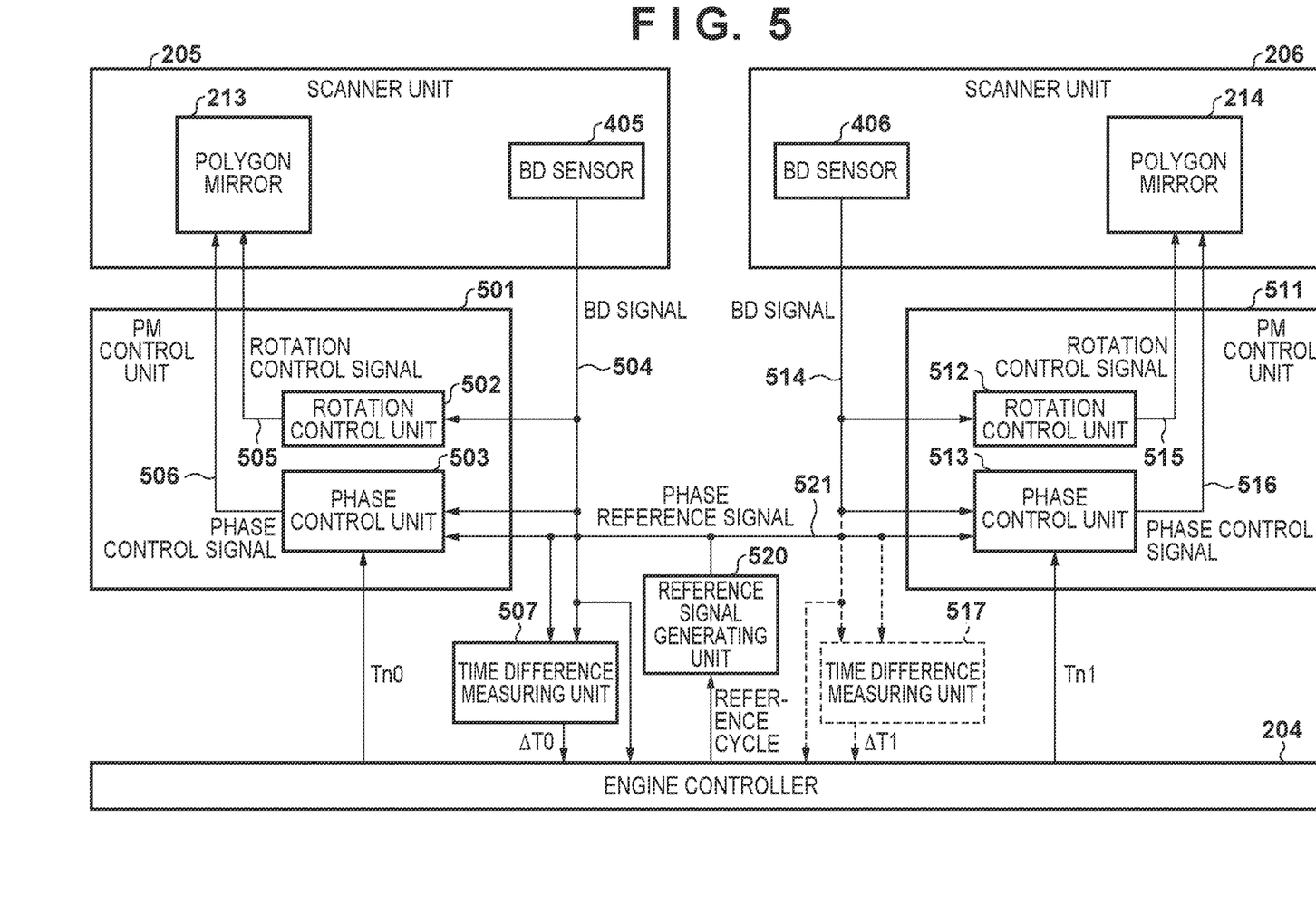
FIG. 5 is a block diagram illustrating an example of a control configuration of scanner units.

FIG. 5 is a block diagram illustrating an example of control configuration of the scanner units 205 and 206 according to the present embodiment. The part indicated by a broken line in FIG. 5 is a part that is added in a second embodiment. As illustrated in FIG. 5, the laser printer 201 includes the PM control units 501 and 511, a time difference measuring unit 507, and a reference signal generating unit 520, as constituent elements for controlling the scanner units 205 and 206. The PM control unit 501 is configured to control the scanner unit 205 (PM 213), whereas the PM control unit 511 is configured to control the scanner unit 206 (PM 214).

The PM control unit 501 includes a rotation control unit 502 and a phase control unit 503. The PM control unit 501 is configured to receive the BD signal 504 output from the BD sensor 405 of the scanner unit 205, and perform rotation control and phase control of the PM 213 based on the BD signal 504 by using a rotation control signal 505 and a phase control signal 506. In the present embodiment, the BD sensor 405 functions as one example of a first detection unit which is provided on the scanning path of the light beam deflected by the PM 213 (first rotating polygonal mirror) and which is configured to output a first BD signal (first detection signal) when the light beam is made incident on the first detection unit.

The rotation control unit 502 is configured to measure a cycle of the BD signal, which is equivalent to the rotation speed of the PM 213 (BD cycle), by using the BD signal 504, and to generate the rotation control signal 505 that will control the rotation such that the BD cycle will approach a target cycle. The rotation control unit 502 performs speed control for making the rotation speed of the PM 213 be converged to a target of the rotation speed such that, if the BD cycle is longer than the target cycle, the rotation speed is accelerated, and if the BD cycle is shorter than the target cycle, the rotation speed is decelerated.

In the example above, the BD cycle is used for measuring the rotation speed of the PM 213. However, the rotation speed of the PM 213 may be measured by using a signal width of the BD signal. Moreover, the rotation speed of the PM 213 may be measured by using an FG signal obtained from a detection element which is provided to a driving motor for rotating the PM 213 and which is configured to detect a magnetic pattern.

The phase control unit 503 is configured to generate the phase control signal 506 for control of the rotation phase of the PM 213 (for phase control), by using the phase reference signal 521 generated by the reference signal generating unit 520, and the BD signal 504. An operation of the phase control unit 503 will be described later. Note that, in the present embodiment, the phase control unit 503 functions as one example of a first phase control unit configured to perform the phase control of the PM 213 based on the first BD signal output from the BD sensor 405 and a target phase Tn0.

The PM control unit 511 has a configuration identical with that of the PM control unit 501, and includes the rotation control unit 512 and the phase control unit 513. The PM control unit 511 is configured to receive the BD signal 514 from the BD sensor 406, and to perform the rotation control of the PM 214 based on the BD signal 514 by using the rotation control signal 515 and the phase control signal 516. Note that, in the present embodiment, the BD sensor 406 is functions as one example of a second detection unit which is provided on the scanning path of the light beam deflected by the PM 214 (second rotating polygonal mirror), and which is configured to output a second BD signal (second detection signal) when the light beam is made incident on the second detection unit. Moreover, the phase control unit 513 functions as one example of a second phase control unit configured to perform the phase control of the PM 214 based on the second BD signal output from the BD sensor 406 and a target phase Tn1, which is set with respect to the target phase Tn0.

The reference signal generating unit 520 is configured to generate the identical phase reference signals 521 for the phase control units 503 and 513. The phase reference signal 521 is a signal generated with a reference cycle, which is set by the engine controller 204. The engine controller 204 sets the reference cycle for the reference signal generating unit 520 by outputting a reference cycle setting value to the reference signal generating unit 520.

The time difference measuring unit 507 is configured to measure a time difference between the BD signal 504 and the phase reference signal 521 as a reception time difference ΔT0, and sends the measurement value thus obtained to the engine controller 204. The engine controller 204 computes (sets) the target phase Tn0 for the phase control unit 503 and the target phase Tn1 for the phase control unit 513 by using the measurement value of the reception time difference ΔT0 received from the time difference measuring unit 507. The engine controller 204 performs the settings for the phase control units 503 and 513 by outputting the setting value of the target phase Tn0 and the setting value of the target phase Tn1 to the phase control units 503 and 513, respectively.

<Operation of Phase Control Units>

Figure 6A:
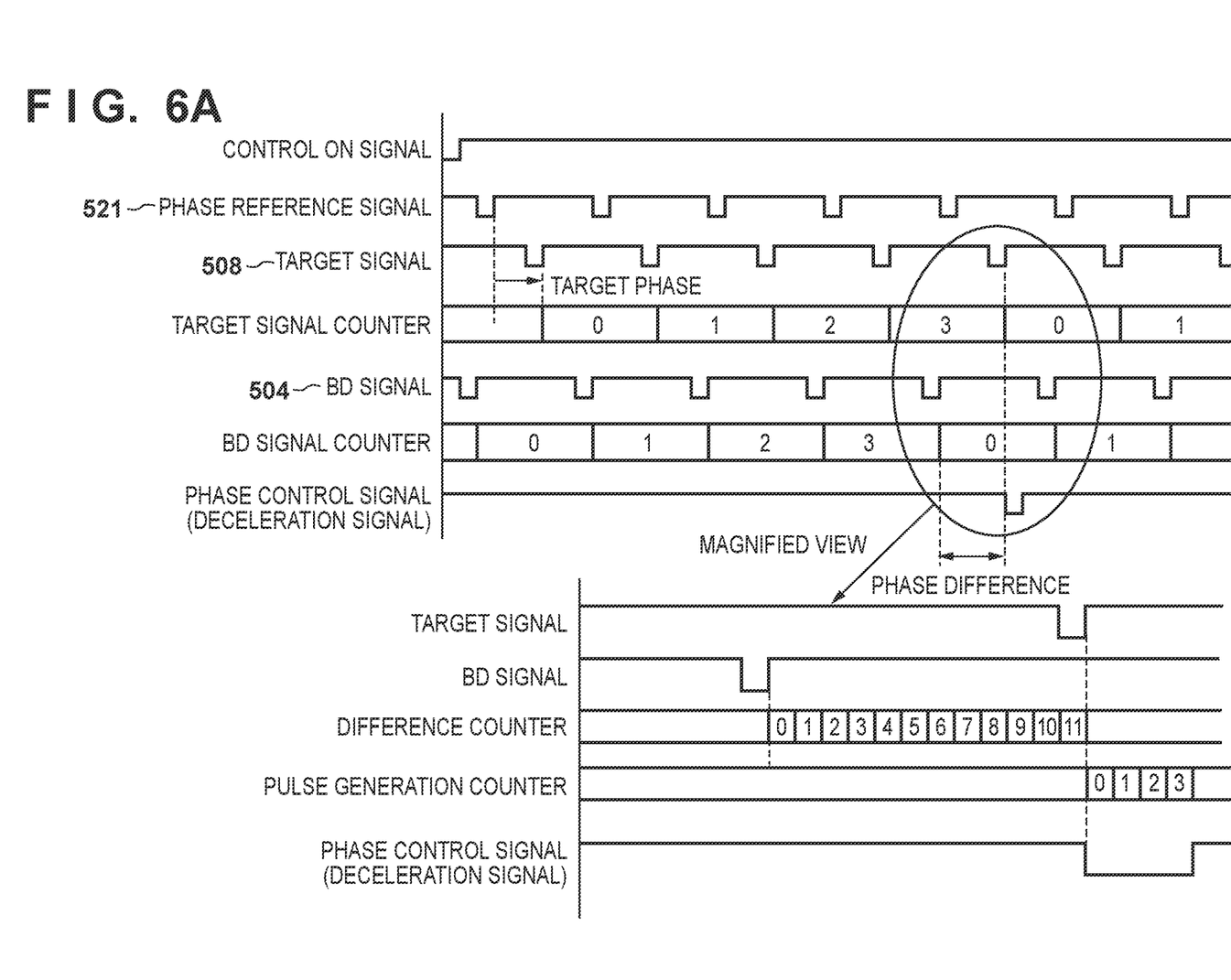
FIGS. 6A and 6B are timing charts for signals relating to a phase control unit.
Figure 6B:
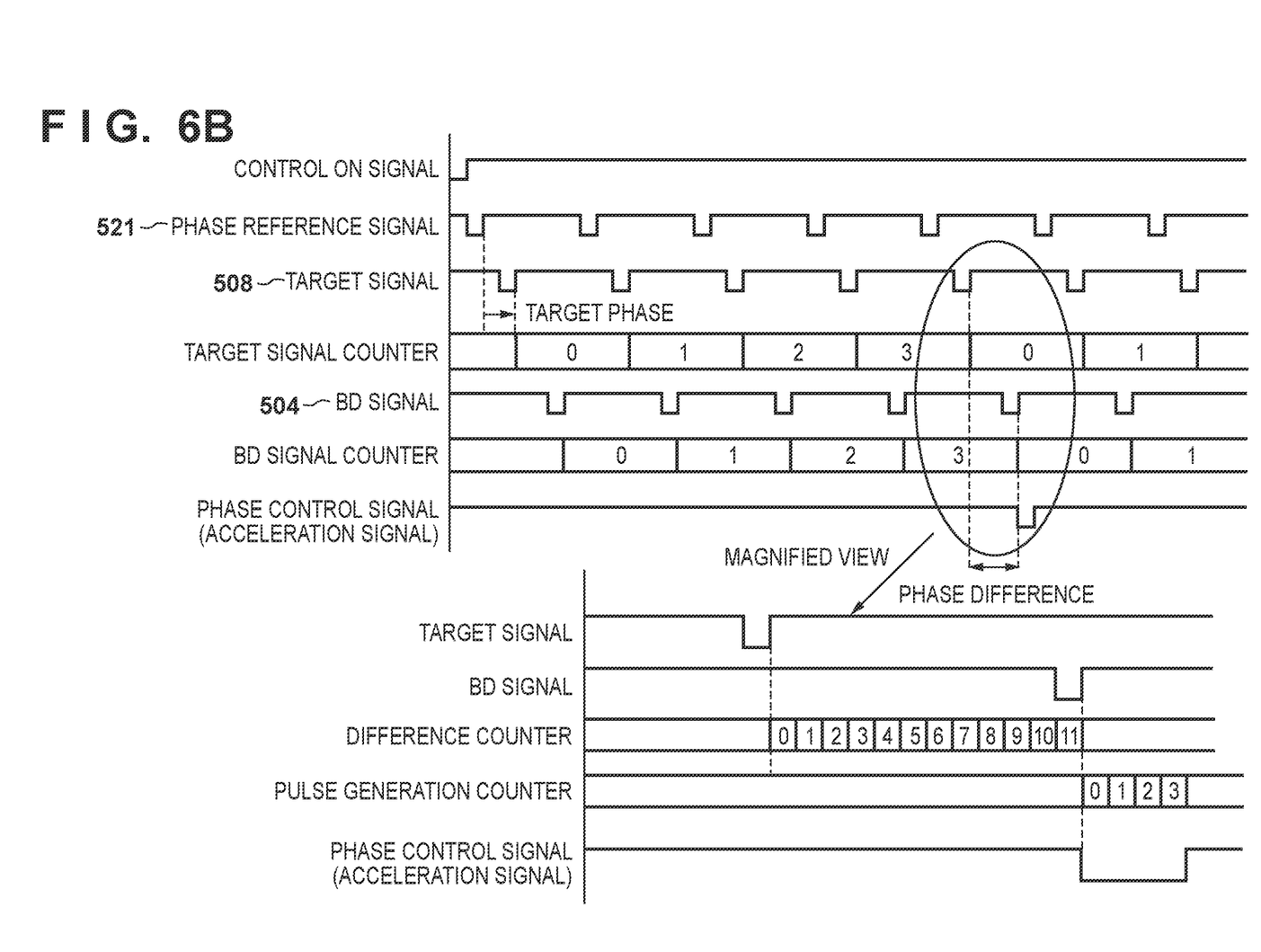

FIGS. 6A and 6B are timing charts for the signals related to the phase control units 503 and 513 according to the present embodiment. Because the phase control units 503 and 513 perform the identical operation, the following describes the phase control unit 503, omitting the description for the phase control unit 513.

The phase control unit 503 generates a target signal 508 for phase control of the BD signal 504, by shifting the phase of the phase reference signal 521 by the target phase Tn0. Furthermore, the phase control unit 503 generates the phase control signal 506 such that the target signal 508 and the BD signal 504 match each other, and performs the control of the rotation phase of the PM 213 (performs phase control) by outputting the phase control signal 506 to the PM 213. Note that the target phase Tn0 is set for the phase control unit 503 by the engine controller 204. The engine controller 204 sets the target phase Tn0 based on detection data obtained from the registration detecting sensor 212, and outputs the setting value of the target phase Tn0 to the phase control unit 503.

When the phase control unit 503 receives a control ON signal from the engine controller 204, the phase control unit 503 starts counting of the BD signal by a BD signal counter and counting of the target signal 508 by a target signal counter. The BD signal counter is a counter for use in counting of the BD signal 504, and the target signal counter is a counter for use in counting of the target signal 508.

When both of the count values of the BD signal counter and the target signal counter reach the respective setting values set by the engine controller 204, the phase control unit 503 measures a time difference (phase difference) between the target signal 508 and the BD signal 504 using a difference counter. If the measured phase difference becomes smaller than a predetermined value (that is, the phase difference between the target signal 508 and the BD signal 504 gets closer to zero), the phase control unit 503 ends the phase control of the PM 213. Furthermore, the phase control unit 503 reports the engine controller 204 that the phase control of the PM 213 is complete (that is, the PM 213 is in a phase lock state).

FIG. 6A illustrates, as one example, a case where the phase control unit 503 outputs a deceleration signal as the phase control signal 506. Here, the setting values of the BD signal counter and the target signal counter are assumed to be zero. The measurement of the phase difference between the target signal 508 and the BD signal 504 is performed by using the target signal 508 obtained when the count value of the target signal counter reaches three, and the BD signal 504 obtained when the count value of the BD signal counter reaches three. In FIG. 6A, the count value of the BD signal 504 reaches three (setting value) before the count value of the target signal 508 reaches three, and thus, a deceleration signal is output as the phase control signal 506 for delaying the phase of the BD signal 504. In this example, it is assumed that the deceleration signal has a pulse width that is one-quarter of the phase difference. However, this is merely an example, and a ratio of the pulse width of the deceleration signal with respect to the pulse width of the phase difference may be determined based on, for example, properties of the polygon motor in practice.

FIG. 6B illustrates, as one example, a case where the phase control unit 503 outputs an acceleration signal as the phase control signal 506. In FIG. 6B, the count value of the BD signal 504 reaches three (setting value) after the count value of the target signal 508 reaches three, and thus, an acceleration signal is output as the phase control signal 506 for advancing the phase of the BD signal 504. In this example, it is assumed that the acceleration signal has a pulse width that is one-quarter of the phase difference. However, this is merely an example, and a ratio of the pulse width of the acceleration signal with respect to the pulse width of the phase difference may be determined based on, for example, properties of the polygon motor in practice.

In the example above, the setting values of the target signal counter and the BD signal counter, which define the timing of measuring the phase difference, are three. However, these setting values may be determined in consideration of, for example, the properties of the polygon motor and the signals output from the rotation control units 502 and 512, for improving the measurement accuracy.

<Control Procedure>

Figure 1:
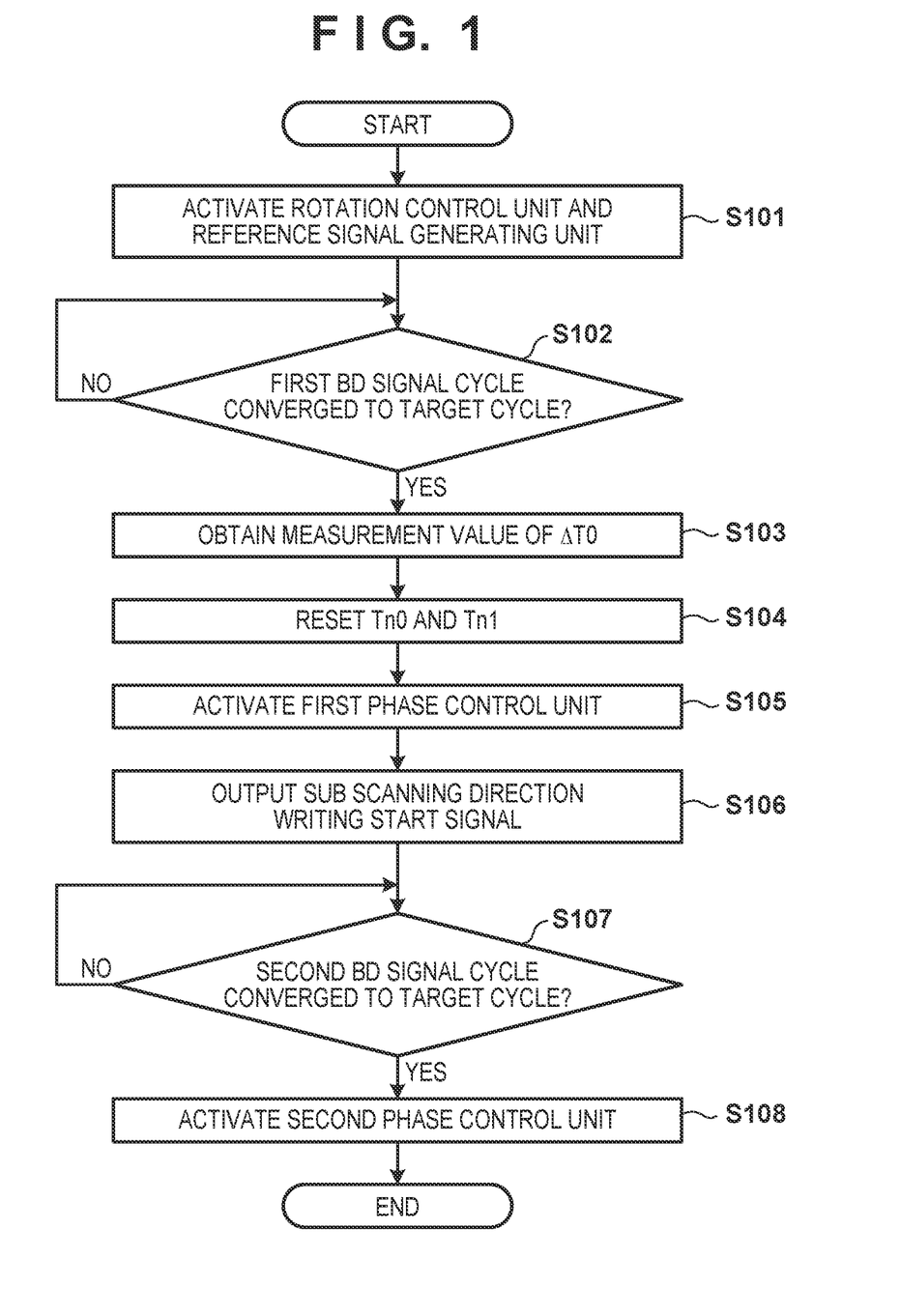
FIG. 1 is a flowchart illustrating a control procedure performed by an engine controller.

FIG. 1 is a flowchart illustrating a control procedure performed by the engine controller 204 according to the present embodiment. The engine controller 204 obtains the detection data from the registration detecting sensor 212 by performing the color misregistration correction control, and, based on the detection data, sets the target phases Tn0 and Tn1 respectively for the BD signals 504 and 514 for the color misregistration correction. In this Example, assume that the target phase Tn0 is set to T0 and the target phase Tn1 is set to T1. In this case, the phase control units 503 and 513 respectively perform the phase controls of the PMs 213 and 214 such that the phase difference of the BD signal 514 with respect to the BD signal 504 will be (T1−T0). This phase difference (T1−T0) is equivalent to the target phase difference for the phase controls of the phase control units 503 and 513. After that, the engine controller 204 performs the processing of the control procedure illustrated in FIG. 1, when receiving a print start instruction from the external apparatus 202.

To begin with, in step S101, the engine controller 204 activates the rotation control units 502 and 512 and the reference signal generating unit 520. As a result of this, the rotation controls of the PMs 213 and 214 are started to be executed by the rotation control units 502 and 512 such that the PMs 213 and 214 will rotate at the rotation speeds corresponding to the predetermined target cycle of the BD signals.

Next, in step S102, the engine controller 204 performs a determination regarding the BD signal 504 (first BD signal) obtained from the scanner unit 205 corresponding to the image forming unit that performs the image formation firstly among the four image forming units that perform the image formation of the four colors in order. Specifically, the engine controller 204 determines whether or not the BD cycle of the BD signal 504 is within a predetermined error range from the target cycle (that is, whether or not the BD cycle has been converged to the target cycle). In the present embodiment, the image formation performed by the image forming unit for Y image (formation of an electrostatic latent image on the photosensitive drum 301) is performed first. Thus, the BD signal 504 output from the scanner unit 205 corresponding to the image forming unit for Y image is used for the determination. Note that, the predetermined error range may be set and changed by the engine controller 204. If the engine controller 204 determines that the BD cycle has been converged to the target cycle, it advances the process to step S103.

In step S103, the engine controller 204 obtains, from the time difference measuring unit 507, a measurement value of the reception time difference ΔT0 between the BD signal 504 and the phase reference signal 521. The reception time difference ΔT0 is equivalent to the phase difference between the phase reference signal 521 and the BD signal 504.

After that, in step S104, the engine controller 204 resets the target phases Tn0 and Tn1 as below, based on the measurement value of the reception time difference ΔT0 thus obtained, and the phase difference (T1−T0) between the target phases Tn0 and Tn1.

$$Tn0 = \Delta T0$$

$$Tn1 = \Delta T0 + (T1 - T0) \quad (1)$$

In this resetting, the target phase Tn0 of the BD signal 504 (for the phase control unit 503) is set to the value equal to the reception time difference ΔT0. Furthermore, the target phase Tn1 of the BD signal 514 (for the phase control unit 513) is set to ΔT0+(T1−T0) so that the phase difference between the BD signal 504 and the BD signal 514 will be (T1−T0), which is the target phase difference.

As described above, the engine controller 204 according to the present embodiment sets the target phase Tn0 (first target phase) by using the reception time difference ΔT0 measured by the time difference measuring unit 507. Furthermore, the engine controller 204 sets the target phase Tn1 (second target phase) such that the phase difference between the target phase Tn0 and the target phase Tn1 will be equal to the target phase difference (T1−T0) with respect to the target phase Tn0.

As a result of resetting the target phases Tn0 and Tn1 as such, the target signal 508 for the phase control, which is generated in the phase control unit 503, becomes a signal obtained by phase-shifting the phase reference signal 521 by the target phase Tn0. Specifically, as the result of the resetting, the target signal 508 becomes a signal having a phase difference of ΔT0 with respect to the phase reference signal 521. That is, the phase difference between the target signal 508 and the BD signal 504 will be zero. This means that the PM 213 is already in the phase lock state when the phase control of the PM 213 by the phase control unit 503 is started.

After the resetting of the target phases Tn0 and Tn1, in step S105, the engine controller 204 activates the phase control unit 503 by inputting a control ON signal into the phase control unit 503 (first phase control unit). The phase control unit 503 generates the target signal 508 based on the target phase Tn0 set by the engine controller 204 in step S104, and starts the phase control of the PM 213. Specifically, the phase control unit 503 performs the rotation control of the PM 213 by using the phase control signal 506 such that the phase difference between the BD signal 504 and the target signal 508 corresponding to the target phase Tn0 will get closer to zero.

However, at this timing, the phase difference between the target signal 508 and the BD signal 504 has been already smaller than the predetermined value and the PM 213 is in the phase lock state. Thus, the phase control unit 503 completes the phase control immediately after the activation. As a result, the engine controller 204 is notified from the phase control unit 503, immediately after the activation of the phase control unit 503, that the PM 213 is in the phase lock state.

If the engine controller 204 receives, from the phase control unit 503, the information indicating that the PM 213 is in the phase lock state, the engine controller 204 transmits (outputs) the writing start signal in the sub scanning direction to the video controller 203 in step S106. As a result of this, the generation and output of the image signals for forming Y image and M image by the video controller 203 are started sequentially, and the formation of the Y image and M image onto the photosensitive drums 301 and 302 are started sequentially. As described above, in the present embodiment, since the phase control of the PM 213 included in the scanner unit 205 corresponding to the image forming unit for performing the first image formation is completed in a short time, it is possible to shorten FPOT.

After that, in step S107 the engine controller 204 performs a determination regarding the BD signal 514 (second BD signal) obtained from the scanner unit 206 corresponding to the image forming units that performs the image formation next (after the image forming units for Y image and M image). Since, in the present embodiment, the image formation by the image forming units for C image and BK image (formation of electrostatic latent images on the photosensitive drums 303 and 304) are performed sequentially after the image forming units for Y image and M image, the BD signal 514 output from the scanner unit 206 corresponding to the image formation by the image forming units for C image and BK image is used for the determination. Specifically, the engine controller 204 determines whether or not the BD cycle of the BD signal 514 is within a predetermined error range from the target cycle (that is, whether or not the BD cycle has been converged to the target cycle), as in the determination regarding the BD signal 504. If the engine controller 204 determines that the BD cycle has been converged to the target cycle, it advances the process to step S108.

In step S108, the engine controller 204 activates the phase control unit 513 (second phase control unit) by inputting the control ON signal into the phase control unit 513. The phase control unit 513 generates the target signal 518 based on the target phase Tn1, which is set by the engine controller 204 in step S104, and starts the phase control of the PM 214. Note that the target signal 518 is a signal obtained by phase-shifting the phase reference signal 521 by the target phase Tn1. Specifically, the phase control unit 513 performs the phase control of the PM 214 by using the phase control signal 516 such that the phase difference between the BD signal 514 and the target signal 518 corresponding to the target phase Tn1 gets closer to zero. The phase control unit 513 completes the phase control of the PM 214 if the phase difference becomes smaller than the predetermined value, and reports that the PM 214 is in the phase lock state.

If the engine controller 204 receives, from the phase control unit 513, the information indicating that the PM 214 is in the phase lock state, and if a predetermined time has passed from the start timing of the formation of the Y image and M image, the engine controller 204 starts the formation of the C image and the BK image. As such, some time lag is necessary from the activation of the phase control unit 513 to the completion of the phase control of the PM 214 (bringing the PM 214 into the phase lock state). However, the phase control of the PM 214 by the phase control unit 513 is performed based on the phase difference with respect to the rotation phase of the PM 213 (the phase difference of the BD signal 514 with respect to the BD signal 504). This makes it possible to shorten the time necessary for the phase control, thereby making it possible to complete the phase control of the PM 214 before the predetermined time has passed from the start timing of the formation of the Y image and M image. As a result, it is possible to realize FPOT as short as that of a case where the phase control of the polygon mirror is not performed.

Even though the present embodiment describes the configuration example in which the two scanner units 205 and 206 are used, any number of scanner units as long as two or more scanner units may be provided. For example, it may be so configured that one scanner unit is provided for each one of the photosensitive drums. Moreover, the present embodiment describes the case where all of the polygon mirrors are started and driven at the same time, a driving sequence in which the polygon mirrors corresponding to the image forming units starting the image formation earlier are started and driven earlier may be employed.

As described above, in the optical scanning apparatus according to the present embodiment, the phase control unit 503 corresponding to the scanner unit 205 performs the phase control of the PM 213 based on the BD signal 504 output from the BD sensor 405 and the target phase Tn0. Moreover, the phase control unit 513 corresponding to the scanner unit 206 performs the phase control of the PM 214 based on the BD signal 514 output from the BD sensor 406 and the target phase Tn1, which is set with respect to the target phase Tn0. As such, using as a reference the phase control of the PM 213 of the scanner unit 205, which forms the electrostatic latent image on the photosensitive drum firstly, the phase control of the PM 214 of the scanner unit 206, which is another scanner unit than the scanner unit 205, is performed.

Specifically, the engine controller 204 measures the time difference ΔT0 between the phase reference signal 521 and the BD signal 504 and generates the target signal 508 based on ΔT0, regarding the PM 213 of the scanner unit 205, which forms the electrostatic latent image on the photosensitive drum 301 firstly. After that, the engine controller 204 generates the target signal 518 for the PM 214 (another PM) such that the target signal 518 has a time difference with respect to the target signal 508, the time difference being equivalent to the target phase difference. The phase control units 503 and 513 perform the phase controls of the PMs 213 and 214 by using the target signals 508 and 518, respectively. According to the present embodiment, it is possible to shorten the time necessary for the phase controls of the PM 213 and PM 214. As a result, it becomes possible to shorten the FPOT of the laser printer 201.

Second Embodiment

Second embodiment describes an example in which the phase control of each polygon mirror is performed in consideration of a time period from the start of the formation of the electrostatic latent image by the scanner unit that firstly forms the electrostatic latent image on the photosensitive drum, to the start of the formation of the electrostatic latent image by another scanner unit. In the following, the second embodiment will be described with reference to FIGS. 5, 7, 8A, and 8B. The second embodiment will mainly describe parts different from the first embodiment, omitting the description on the parts common to the first embodiment.

<Control Configuration of the Scanner Units>

The scanner units 205 and 206 according to the present embodiment have a control configuration basically similar to that of the first embodiment as illustrated in FIG. 5, except that the scanner units 205 and 206 according to the present embodiment further has a part indicated with the broken line in FIG. 5. Specifically, the laser printer 201 further includes a time difference measuring unit 517. Moreover, the BD signal 514 output from the BD sensor 406 (scanner unit 206) is also input into the time difference measuring unit 517 and the engine controller 204, and the phase reference signal 521 output from the reference signal generating unit 520 is also input into the time difference measuring unit 517.

The time difference measuring unit 517 has a function similar to the time difference measuring unit 507. The time difference measuring unit 517 measures the time difference between the BD signal 514 and the phase reference signal 521 as a reception time difference ΔT1, and sends a measurement value of the reception time difference ΔT1 to the engine controller 204. The engine controller 204 calculates (sets) the target phase Tn0 for the phase control unit 503 and the target phase Tn1 for the phase control unit 513, by using the measurement values of the reception time differences ΔT0 and ΔT1 respectively received from the time difference measuring units 507 and 517. The engine controller 204 performs settings for the phase control units 503 and 513 by outputting the setting values of the target phases T0 and T1 to the phase control units 503 and 513, respectively.

<Control Procedure>

Figure 7:
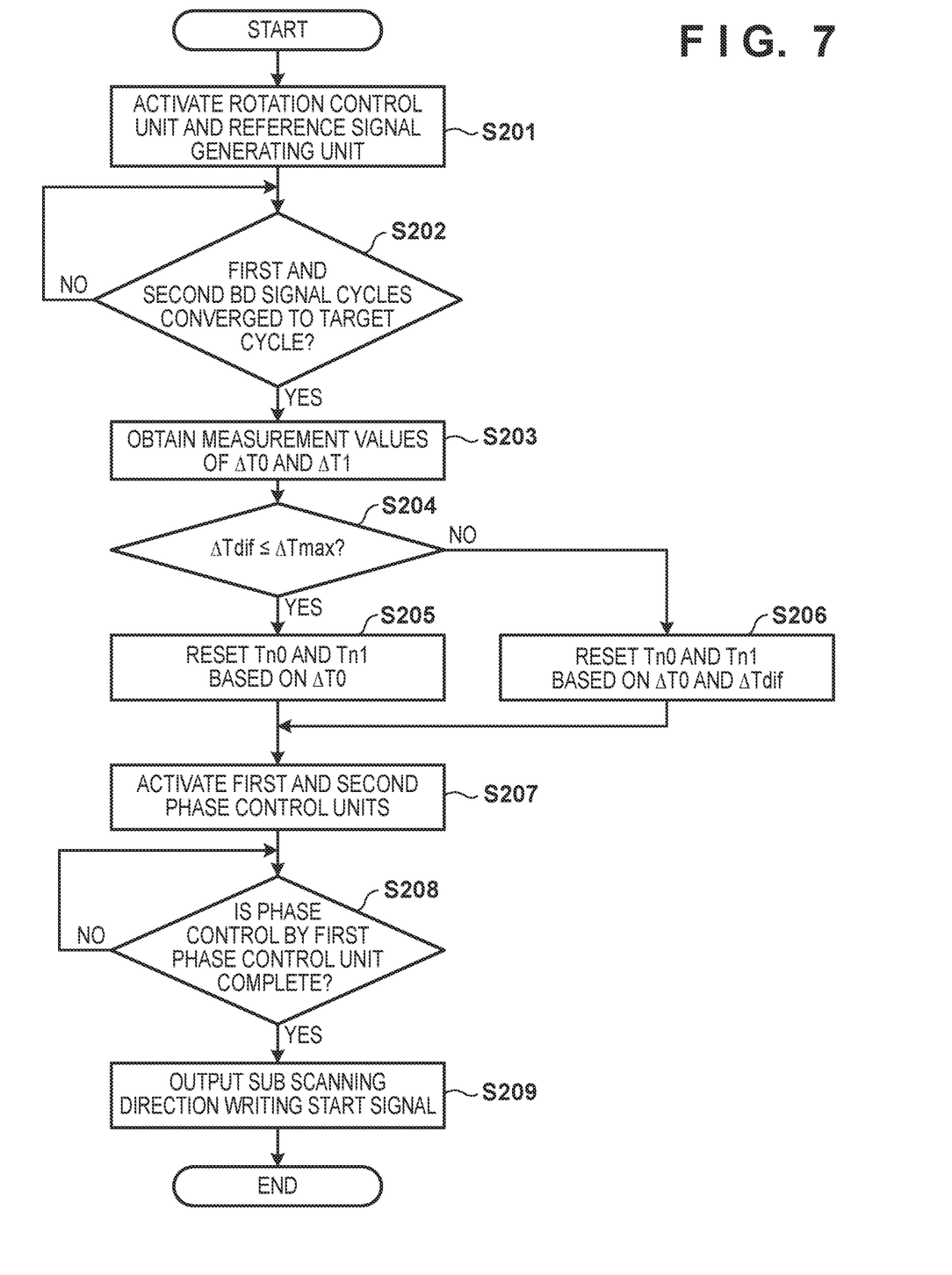
FIG. 7 is a flowchart illustrating a control procedure performed by an engine controller (Second Embodiment).

FIG. 7 is a flowchart illustrating a control procedure performed by the engine controller 204 according to the present embodiment. As in the first embodiment, the engine controller 204 obtains the detection data from the registration detecting sensor 212 by performing the color misregistration correction control, and sets the target phase Tn0 for the BD signal 504 and the target phase Tn1 for the BD signal 514 for the color misregistration correction. As in the first embodiment, assume that the target phase Tn0 is set to T0, and the target phase Tn1 is set to T1. If the engine controller 204 is instructed by the external apparatus 202 to start printing, the engine controller 204 performs the process according to the control procedure illustrated in FIG. 7.

To begin with, in step S201, the engine controller 204 activates the rotation control units 502 and 512, and the reference signal generating unit 520. As a result of this, the rotation controls of the PMs 213 and 214 are started to be executed by the rotation control units 502 and 512 such that the PMs 213 and 214 will rotate at the rotation speed corresponding to the predetermined target cycle of the BD signals.

Next, in step S202, the engine controller 204 performs a determination regarding the BD signal 504 (first BD signal) and the BD signal 514 (second BD signal) obtained respectively from the scanner units 205 and 206. Specifically, the engine controller 204 determines, for each of the BD signals 504 and 514, whether or not the BD cycle is within a predetermined error range from the target cycle (that is, whether or not the BD cycle has been converged to the target cycle), as in steps S102 and S107 in the first embodiment. If the engine controller 204 determines, for the BD cycles of both the BD signals 504 and 514, that the BD cycle has been converged to the target cycle, it advances the process to step S203.

In step S203, the engine controller 204 obtains the measurement value of the reception time difference $\Delta T0$ between the BD signal 504 and the phase reference signal 521, from the time difference measuring unit 507. Furthermore, the engine controller 204 obtains the measurement value of the reception time difference $\Delta T1$ between the BD signal 514 and the phase reference signal 521, from the time difference measuring unit 517. Here, the reception time difference $\Delta T0$ is equivalent to the phase difference of the BD signal 504 with respect to the phase reference signal 521, and the reception time difference $\Delta T1$ is equivalent to the phase difference of the BD signal 514 with respect to the phase reference signal 521.

In step S204, the engine controller 204 determines whether or not the phase control of the PM 214 can be completed within a time period (delay time) from the timing of starting the formation of the Y image which is to be formed firstly, to the timing of starting the formation of the C image which is to be formed firstly by the scanner unit 206. The engine controller 204 stores, in advance, a maximum value $\Delta T$max of the phase difference for the BD signal 514, where the maximum value $\Delta T$max is such a value that the phase control unit 513 can complete the phase control of the PM 214 (that is, the PM 214 can be brought to the phase lock state) within the delay time from the timing of starting the formation of the Y image to the timing of starting the formation of the C image.

The maximum value $\Delta T$max stored by the engine controller 204 is equivalent to a maximum value of the phase difference between the BD signal 514 and the target signal 518 corresponding to the target phase Tn1, where the maximum value is such a value that the phase control by the phase control unit 513 can be completed within the delay time mentioned above. Note that $\Delta T$max is predetermined based on, for example, the time from the timing of starting the formation of the Y image to the timing of starting the formation of the C image, and inertia of the polygon motor (scanner motor).

Figure 8A:
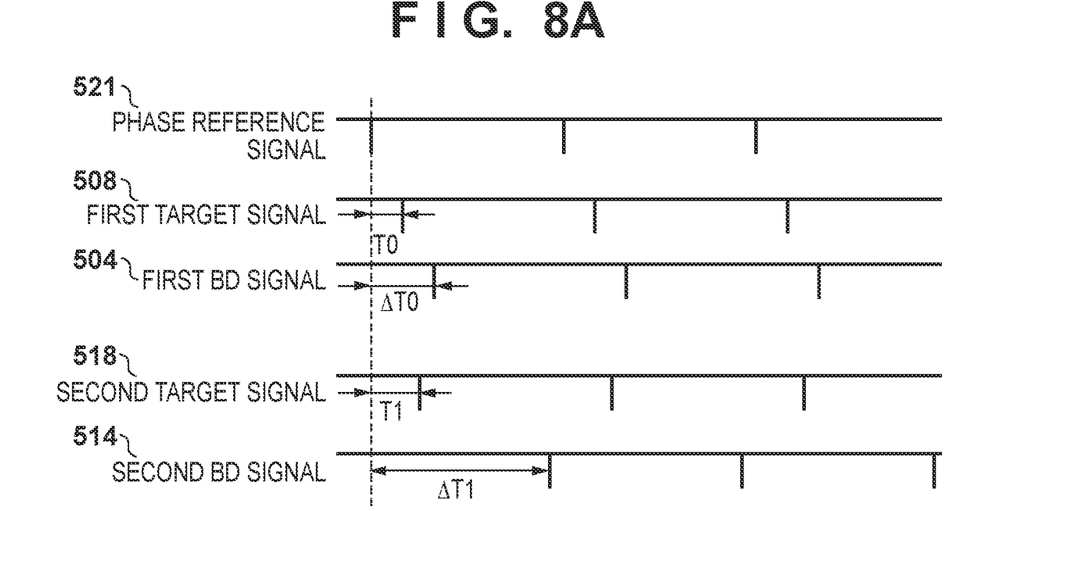
FIGS. 8A and 8B are timing charts for signals relating to a phase control unit (Second Embodiment).
Figure 8B:
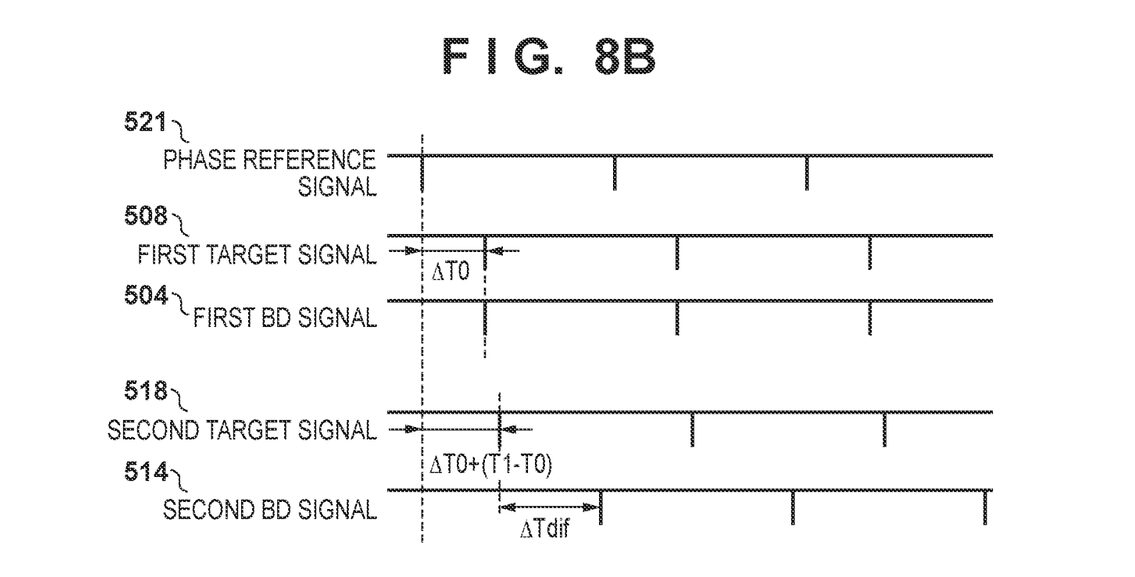

FIGS. 8A and 8B are timing charts of the signals relating to the phase control units 503 and 513 according to the present embodiment. FIG. 8A illustrates examples of the phase reference signal 521, the target signal 508 (first target signal), the BD signal 504 (first BD signal), the target signal 518 (second target signal), the BD signal 514 (second BD signal) before the resetting of the target phases Tn0 and Tn1 is performed.

Moreover, FIG. 8B illustrates examples of these signals after the resetting of the target phases Tn0 and Tn1 is performed as in the first embodiment (the resetting in step S104 as illustrated in FIG. 1). In this case, the target signal 508 is generated as a signal having the phase difference of $\Delta T0$ with respect to the phase reference signal 521, so as to match the BD signal 504. On the other hand, the target signal 518 is generated as a signal having the phase difference of $(\Delta T0+(T1-T0))$ with respect to the phase reference signal 521.

Here, a phase difference $\Delta T$dif between the target signal 518 and the BD signal 514 is calculated according to the following equation.

$$\Delta Tdif = \Delta T1 - (\Delta T0 + (T1 - T0)) \quad (2)$$
$$= (\Delta T1 - \Delta T0) - (T1 - T0)$$

If this phase difference $\Delta T$dif is less than or equal to $\Delta T$max, the resetting of the target phases Tn0 and Tn1 as described above makes it possible that the phase control unit 513 completes the phase control of the PM 214 before the timing of starting the formation of the C image by the scanner unit 206. On the other hand, if the phase difference $\Delta T$dif is greater than $\Delta T$max, the resetting of the target phases Tn0 and Tn1 as described above cannot make it possible that the phase control unit 513 completes the phase control of the PM 214 before the timing of starting the formation of the C image by the scanner unit 206.

Accordingly, in step S204, the engine controller 204 compares $\Delta T$max and $\Delta T$dif, and determines whether or not $\Delta T$dif≤$\Delta T$max. As a result, the engine controller 204 advances the process to step S205 if $\Delta T$dif is less than or equal to $\Delta T$max, and the engine controller 204 advances the process to step S206 if $\Delta T$dif is greater than $\Delta T$max.

(In the Case Where $\Delta T$dif≤$\Delta T$max)

In step S205, the engine controller 204 resets the target phases Tn0 and Tn1 as below, based on the measurement value of the reception time difference $\Delta T0$ and the phase difference (T1−T0) between the target phases Tn0 and Tn1, as in step S104 in the first embodiment.

$Tn0=\Delta T0$ $Tn1=\Delta T0+(T1-T0)$ \quad (3)

Next in step S207, the engine controller 204 activates the phase control unit 503 (first phase control unit) and the phase control unit 513 (second phase control unit), thereby causing the phase control unit 503 and the phase control unit 513 to start the phase control of the PMs 213 and 214. After that, in step S208, the engine controller 204 determines whether or not the phase control by the phase control unit 503 has been completed. If the engine controller 204 receives, from the phase control unit 503, the information indicating that the PM 213 is in the phase lock state, the engine controller 204 determines that the phase control has been completed, and advances the process to step S209. In step S209, the engine controller 204 starts the image formation of each color sequentially from that for the Y image (in the order of Y, M, C, and BK), by transmitting (outputting) writing start signal in the sub scanning direction to the video controller 203.

Here, as in the first embodiment, the PM 213 has been in the phase lock state right after the activation of the phase control unit 503 (immediately after the start of the phase control of the PM 213), and thus the phase control by the phase control unit 503 is completed soon. This allows the formation of the Y image and the M image by the scanner unit 205 to be started. Moreover, this makes it possible that the phase control unit 513 completes the phase control of the PM 214 within the delay time from the timing of starting the formation of the Y image to the timing of starting the formation of the C image performed by the scanner unit 206. Thus, the timing of starting the formation of C image will not be delayed due to the phase control performed by the phase control unit 513, and the FPOT will not be prolonged. As such, it becomes possible to complete the phase control of the PM 214 without prolonging the FPOT.

(In the Case Where ΔTdif>ΔTmax)

On the other hand, if ΔTdif>ΔTmax, the resetting in step S205 would result in that the phase control of the PM 214 by the phase control unit 513 is not completed within the delay time from the timing of starting the formation of the Y image to the timing of starting the formation of the C image. In this case, an additional time of (ΔTdif−ΔTmax) would be needed to complete the phase control by the phase control unit 513. In such a case, the engine controller 204 performs the process of step S206, instead of that of step S205 in the present embodiment.

In step S206, the engine controller 204 resets the target phases Tn0 and Tn1 as below, based on ΔTdif as well as the measurement value of the reception time difference ΔT0, and the phase difference (T1−T0) between the target phases Tn0 and Tn1.

$$Tn0=\Delta T0+(\Delta Tdif-\Delta Tmax)/2$$

$$Tn1=\Delta T0+(\Delta Tdif-\Delta Tmax)/2+(T1-T0) \quad (4)$$

As such, the engine controller 204 sets the target phase Tn0 by using a value obtained by adding, to the time difference ΔT0 measured by the time difference measuring unit 507, the adjustment value (ΔTdif−ΔTmax)/2 which is based on the delay time mentioned above. Furthermore, the engine controller 204 sets the target phase Tn1 such that the phase difference between the target phase Tn0 and the target phase Tn1 will be equal to the target phase difference (T1−T0) with respect to the target phase Tn0. This adjustment value is set based on the ΔTmax and the time difference ΔT1 measured by the time difference measuring unit 517 (ΔTdif obtained from ΔT1), as shown in equation (4).

As a result of the resetting in step S206, the time from the timing of starting the formation of the Y image to the timing of starting the formation of the C image becomes equal to the time from the completion of the phase control of the PM 213 by the phase control unit 503 to the completion of the phase control of the PM 214 by the phase control unit 513. In this case, the phase difference between the BD signal 514 having the phase difference ΔT1 with respect to the phase reference signal 521, and the target signal 518 generated by the phase control unit 513 will become smaller than ΔTdif illustrated in FIG. 8B. As a result, the time additionally required to complete the phase control by the phase control unit 513 will change from (ΔTdif−ΔTmax) to (ΔTdif−ΔTmax)/2. By reducing the time required to complete the phase control by the phase control unit 513 as such, the phase control by the phase control unit 513 will be completed earlier, thereby making it possible to shorten the FPOT.

After the resetting in step S206 is completed, the engine controller 204 performs the processes of steps S207 to S209. In step S207, the engine controller 204 activates the phase control unit 503 (first phase control unit) and the phase control unit 513 (second phase control unit), thereby causing the phase control of the PMs 213 and 214 to be started.

After that, in step S208, the engine controller 204 determines whether or not the phase control by the phase control unit 503 has been completed. After the time period of (ΔTdif−ΔTmax)/2 has passed, the PM 213 is brought to be in the phase lock state by the phase control by the phase control unit 503. As a result of this, the engine controller 204 receives, from the phase control unit 503, the information indicating that the PM 213 is in the phase lock state, and advances the process to step S209. In step S209, the engine controller 204 starts the image formation of each color sequentially from that for the Y image (in the order of Y, M, C, and BK) by transmitting (outputting) the writing start signal in the sub scanning direction to the video controller 203.

Even though the present embodiment describes the configuration example in which the two scanner units 205 and 206 are used, any number of scanner units as long as two or more scanner units may be provided. For example, it may be so configured that one scanner unit is provided for each one of the photosensitive drums.

As described above, in the present embodiment, the engine controller 204 sets the target phases Tn0 and Tn1 such that the phase control by the phase control unit 513 will be completed within the delay time between the timing of starting the exposure of the photosensitive drum 301 with the light beam deflected by the PM 213 (the timing of starting the formation of Y image), and the timing of starting the exposure of the photosensitive drum 303 with the light beam deflected by the PM 214 (the timing of starting the formation of C image). In this way, the phase control is performed by using the target phases Tn0 and Tn1, which are set based on the delay time from the timing of starting the exposure by the scanner unit 205 for firstly forming an electrostatic latent image on the photosensitive drum to the timing of starting the exposure by another scanner unit 206.

With such a configuration that the phase control by the phase control unit 513 is completed earlier by performing the phase control in this way, it becomes possible to shorten the FPOT. Moreover, even in the case where the phase control by the phase control unit 513 is not completed before the timing of starting the exposure by the scanner unit 206, it is still possible to shorten the FPOT.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-173404, filed Sep. 24, 2019, which is hereby incorporated by reference herein in its entirety.

What is claimed is:

1. An optical scanning apparatus, comprising:
a first rotating polygonal mirror to which a light beam is irradiated, and that deflects the light beam such that the light beam scans a surface of a first image carrier;
a second rotating polygonal mirror to which a light beam is irradiated, and that deflects the light beam such that the light beam scans a surface of a second image carrier;
a first detection unit provided on a scanning path of the light beam deflected by the first rotating polygonal mirror, and that outputs a first detection signal when the light beam is made incident on the first detection unit;
a second detection unit provided on a scanning path of the light beam deflected by the second rotating polygonal mirror, and that outputs a second detection signal when the light beam is made incident on the second detection unit;
a first phase control unit that performs phase control of the first rotating polygonal mirror based on the first detection signal output from the first detection unit and a first target phase; and
a second phase control unit that performs phase control of the second rotating polygonal mirror based on the second detection signal output from the second detection unit and a second target phase, which is set with respect to the first target phase.

2. The optical scanning apparatus according to claim 1, further comprising:
a generation unit that generates a reference signal;
a measurement unit that measures a time difference between the first detection signal output from the first detection unit and the reference signal output from the generation unit; and
a setting unit that sets the first target phase and the second target phase,
wherein the setting unit sets the first target phase by using the time difference measured by the measurement unit, and sets the second target phase such that a phase difference between the first target phase and the second target phase will be equal to a target phase difference with respect to the first target phase.

3. The optical scanning apparatus according to claim 2, wherein
the first phase control unit performs the phase control of the first rotating polygonal mirror such that a phase difference between the first detection signal and a first target signal corresponding to the first target phase will get closer to zero, and
the second phase control unit performs the phase control of the second rotating polygonal mirror such that a phase difference between the second detection signal and a second target signal corresponding to the second target phase will get closer to zero.

4. The optical scanning apparatus according to claim 3, wherein
the first target signal is a signal obtained by phase-shifting the reference signal by the first target phase, and
the second target signal is a signal obtained by phase-shifting the reference signal by the second target phase.

5. The optical scanning apparatus according to claim 2, further comprising:
a first rotation control unit that performs rotation control of the first rotating polygonal mirror such that a cycle of the first detection signal output from the first detection unit will get closer to a target cycle,
wherein after the rotation control by the first rotation control unit is completed,
the measurement unit performs the measurement of the time difference, and
the first phase control unit performs the phase control of the first rotating polygonal mirror based on the first target phase set by the setting unit.

6. The optical scanning apparatus according to claim 5, further comprising:
a second rotation control unit that performs rotation control of the second rotating polygonal mirror such that a cycle of the second detection signal output from the second detection unit will get closer to a target cycle,
wherein the second phase control unit performs the phase control of the second rotating polygonal mirror after the rotation control by the second rotation control unit is completed and the phase control by the first phase control unit is completed.

7. The optical scanning apparatus according to claim 1, further comprising:
a setting unit that sets the first target phase and the second target phase,
wherein the setting unit sets the first target phase and the second target phase such that the phase control by the second phase control unit will be completed within a delay time from a timing of starting exposure of the first image carrier with the light beam deflected by the first rotating polygonal mirror to a timing of starting exposure of the second image carrier with the light beam deflected by the second rotating polygonal mirror.

8. The optical scanning apparatus according to claim 7, further comprising:
a generation unit that generates a reference signal;
a first measurement unit that measures a time difference between the first detection signal output from the first detection unit, and the reference signal output from the generation unit,
wherein the setting unit sets the first target phase by using a value obtained by adding, to the time difference measured by the first measurement unit, an adjustment value based on the delay time, and sets the second target phase such that a phase difference between the first target phase and the second target phase will be equal to a target phase difference with respect to the first target phase.

9. The optical scanning apparatus according to claim 8, further comprising:
a second measurement unit that measures a time difference between the second detection signal output from the second detection unit and the reference signal output from the generation unit; and
a storage unit in which a maximum value of a phase difference between the second detection signal and a target signal corresponding to the second target phase is stored, the maximum value being a maximum value of the phase difference which allows the phase control by the second phase control unit to be completed within the delay time,
wherein the setting unit sets the adjustment value based on the maximum value and the time difference measured by the second measurement unit.

10. An image forming apparatus, comprising:
a first image carrier for use in formation of an image of a first color;
a second image carrier for use in formation of an image of a second color; and an optical scanning apparatus comprising:
- a first rotating polygonal mirror to which a light beam is irradiated, and that deflects the light beam such that the light beam scans a surface of the first image carrier;
- a second rotating polygonal mirror to which a light beam is irradiated, and that deflects the light beam such that the light beam scans a surface of the second image carrier;
- a first detection unit provided on a scanning path of the light beam deflected by the first rotating polygonal mirror, and that outputs a first detection signal when the light beam is made incident on the first detection unit;
- a second detection unit provided on a scanning path of the light beam deflected by the second rotating polygonal mirror, and that outputs a second detection signal when the light beam is made incident on the second detection unit;
- a first phase control unit that performs phase control of the first rotating polygonal mirror based on the first detection signal output from the first detection unit and a first target phase; and
- a second phase control unit that performs phase control of the second rotating polygonal mirror based on the second detection signal output from the second detection unit and a second target phase, which is set with respect to the first target phase, and wherein the optical scanning apparatus forms an electrostatic latent image on the first image carrier by exposing the first image carrier with the light beam deflected by the first rotating polygonal mirror, and forms an electrostatic latent image on the second image carrier by exposing the second image carrier with the light beam deflected by the second rotating polygonal mirror.

* * * * *